(12) United States Patent
Leclercq et al.

(10) Patent No.: US 8,464,344 B2
(45) Date of Patent: Jun. 11, 2013

(54) DEVICE FOR RECEIVING MESSAGES, IN PARTICULAR WITHIN THE FRAMEWORK OF SECURE DATA EXCHANGES, ASSOCIATED AIRCRAFT AND METHOD

(75) Inventors: Agnes Leclercq, Toulouse (FR); Cecile Colle-Morlec, Labarthe sur Leze (FR)

(73) Assignee: Airbus Operations SAS, Toulouse (FR)

( * ) Notice: Subject to any disclaimer, the term of this patent is extended or adjusted under 35 U.S.C. 154(b) by 1240 days.

(21) Appl. No.: 12/301,319

(22) PCT Filed: May 14, 2007

(86) PCT No.: PCT/FR2007/000816
§ 371 (c)(1),
(2), (4) Date: Nov. 18, 2008

(87) PCT Pub. No.: WO2007/135274
PCT Pub. Date: Nov. 29, 2007

(65) Prior Publication Data
US 2009/0097649 A1    Apr. 16, 2009

(30) Foreign Application Priority Data

May 19, 2006   (FR) ...................................... 06 51859

(51) Int. Cl.
*G06F 21/00*    (2006.01)

(52) U.S. Cl.
USPC ........................................... 726/23; 380/255

(58) Field of Classification Search
USPC ....................................... 380/255; 726/22, 23
See application file for complete search history.

(56) References Cited

U.S. PATENT DOCUMENTS

| 5,125,096 | A | * | 6/1992 | Brantley et al. | 709/235 |
| 5,958,080 | A | * | 9/1999 | Kang | 714/807 |
| 6,677,888 | B2 | * | 1/2004 | Roy | 342/36 |
| 7,962,741 | B1 | * | 6/2011 | Alexander et al. | 713/151 |
| 2004/0008711 | A1 | | 1/2004 | Lahti et al. | |
| 2004/0047308 | A1 | | 3/2004 | Kavanagh et al. | |
| 2010/0278045 | A1 | * | 11/2010 | Xiang | 370/235 |

FOREIGN PATENT DOCUMENTS

| WO | 03 100544 | 12/2003 |
| WO | 2005 078986 | 8/2005 |

OTHER PUBLICATIONS

U.S. Appl. No. 12/297,219, filed Oct. 15, 2008, Leclercq, et al.

* cited by examiner

*Primary Examiner* — Hadi Armouche
*Assistant Examiner* — Lisa Lewis
(74) *Attorney, Agent, or Firm* — Oblon, Spivak, McClelland, Maier & Neustadt, L.L.P.

(57) ABSTRACT

A device and method for receiving messages each having an order number includes a storage to store a plurality of prior-reception statuses, a mechanism to modify the status associated with an order number on receipt of a message having the order number, and a mechanism to process the message as a function of the status associated with its order number. An aircraft can be equipped with such a device.

28 Claims, 4 Drawing Sheets

DEVICE FOR RECEIVING MESSAGES, IN PARTICULAR WITHIN THE FRAMEWORK OF SECURE DATA EXCHANGES, ASSOCIATED AIRCRAFT AND METHOD

The invention relates to a device for receiving messages, in particular within the framework of secure data exchanges (for example, between an aircraft and a ground base), and also to an associated aircraft and receiving method.

Secure data exchanges between an emitter and a receiver are frequently the object of attacks by persons who are not authorized to know the content of the messages represented by the exchanged data.

An attack of this type, generally referred to as "replay", occurs when the attacker re-emits, at a subsequent opportune moment, a message emitted by the authorized emitter.

To counter this type of attack, it has been proposed to provide a first counter at the emitter and a second counter at the receiver, the counters being synchronized during an initialization phase. In this way, during emission of a message, a counter number is allocated thereto by the emitter device, which increments the counter upon each emission. In turn, the receiver verifies the counter number of each received message and in the same way increments its own counter upon each reception of a message. Thus it is impossible for an attacker to interpose a message in the series of exchanged messages, each identified uniquely by means of the counters.

Nevertheless, this solution is applicable only within the framework of synchronous message protocols, or in other words protocols for which the order of messages during reception is identical to the order of messages upon emission.

It is actually unsuitable for asynchronous message protocols, in which there exists the possibility of a change in the order of messages upon reception compared with the order upon emission. This is the case, for example, when priority levels are allocated to the messages and the transmission of higher-priority messages can take precedence over the transmission of lower-priority messages, as for example, in the ACARS communication protocol (for "*Aircraft Communication Addressing and Reporting System*"), which is commonly used in avionics.

In order to combat the attacks of "replay" type regardless of the protocol used, the invention proposes a device for receiving messages that each have an order number, characterized in that it comprises means for storing a plurality of previous reception statuses in memory, means for modifying the status associated with an order number upon reception of a message having the said order number, and means for processing the message as a function of the status associated with its order number.

The previous reception of a message, identified by its order number, thus can be verified upon reception thereof, and consequently the message can be processed.

For example, the previous reception statuses are stored in memory in the form of a table of bits, which constitutes a practical form of implementation, with low memory cost.

In this case the status associated with the said order number can be represented at a table position corresponding to the said order number.

According to a conceivable embodiment, the table is formed by a plurality of sub-lists that can be easily managed.

When the table contains in practice a finite set of order numbers, the device may comprise means for initializing part of the previous reception statuses when the said order number is not included in the finite set of order numbers.

According to one possibility of practical implementation, there can be provided decryption means for obtaining the message and the order number from an encrypted message.

In order to avoid any risk of attack by replay, there can be provided means for rejecting the message when the said associated status indicates previous reception.

In addition, there can be provided means for displaying the message when, on the contrary, the said associated status does not indicate any previous reception.

The invention also proposes an aircraft, characterized in that it comprises a device such as described hereinabove.

In a similar concept, the invention proposes a method for receiving a message having an order number, characterized by the following steps:

reading of a previous reception status associated with the order number in a memory-storage means;

if the read status does not indicate any previous reception, modification of the status;

if the status indicates previous reception, rejection of the message.

Such a method may exhibit certain optional characteristics described above as regards the device and the advantages derived therefrom.

Finally, the invention proposes an aircraft comprising a device capable of implementing such methods.

Other characteristics of the invention will become evident in light of the description hereinafter, written with reference to the attached drawings, wherein:

FIG. 1 represents the general context in which the invention is implemented.

A ground base B communicates with an aircraft A by means of a link that permits the exchange of data in digital form (or in other words according to the English term "data link") and that in particular implies a ground-to-air link $C_A$.

The link between ground base B and aircraft A may additionally imply other devices and links. For example, in FIG. 1, ground base B communicates with a relay R (also situated on ground T) by means of a land-based communication network $C_T$; relay R transmits the information items to and from aircraft A by way of a satellite S.

It is noted that the use of a relay R is relatively common, because of the fact that the information items exchanged between ground base B and aircraft A are traditionally routed via relay R and satellite S under the responsibility of a service provider.

Alternatively, it could be provided that the information items are exchanged directly between aircraft A and ground base B.

Furthermore, there could be provided the use of HF or VHF radio communications instead of communication by satellite.

Figure 2:
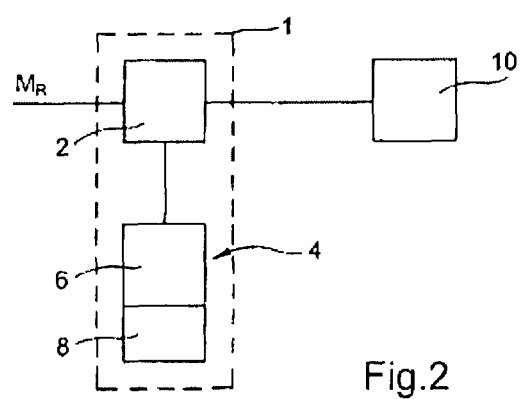
FIG. 2 represents the elements of a receiving device that are useful for understanding the invention.

FIG. 2 represents the receiver elements useful for understanding the invention, several exemplary embodiments of which are presented hereinafter.

A device 1 for receiving and processing messages comprises a microprocessor 2 linked to memory means 4, which in this case comprise a random-access memory 6 and a read-only memory 8.

Figure 1:
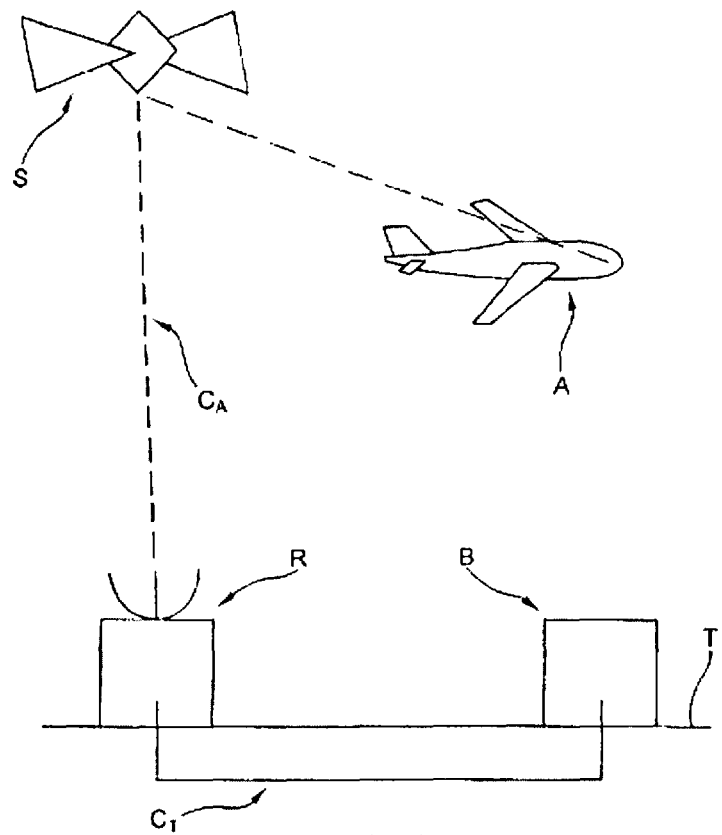
FIG. 1 represents the general context of the invention.

Receiving device 1 receives data, represented in digital form, and which form an encrypted message $M_R$ originating from the emitter, for example in the context that has just been described with reference to FIG. 1.

It will be noted that the term message here means a set of data; it may be a message intended for a user (message in the strict sense), for example in the form of text, but also data or instructions intended for a device, for example of electronic type, on the receiver side.

The data forming the encrypted message $M_R$ were previously constructed from the signal transmitted on transmission channel $C_A$, $C_T$ by appropriate devices of the tuner, demodulator and decoder type, which may be an integral part of receiving device 1 or may constitute the entirety or part of devices external to receiving device 1 and connected thereto.

In its memory, receiving device 1 stores in particular means for decrypting the encrypted message $M_R$, in particular for example a cryptographic key stored in read-only memory 8.

For decryption of the received encrypted message $M_R$, it is stored, for example, in random-access memory 6 then decrypted by means of a method implemented by microprocessor 2 with use of the cryptographic key just mentioned, thus making it possible to obtain the message M, which will be displayed in normal time, as explained hereinafter. For example, the message M is stored temporarily in random-access memory 6.

Decryption of the received message $M_R$ also makes it possible to obtain here an order number n allocated to the message M by the emitter. For example, the order number n is encoded appropriately within the received message $M_R$. Alternatively, the order number n could be transmitted separately from the message $M_R$, while maintaining therewith a link that permits the receiving device to associate them.

The order number n is allocated to the message M in the emitter device, in order to identify this message uniquely. For this purpose, the emitter device uses, for example, a counter dedicated to the receiving device in question: in this case the order number of the message is the value of the counter upon emission, and the counter is incremented upon each emission of a message.

In the embodiment described here, the order numbers therefore correspond to the order of messages upon emission. It nevertheless would be possible to envision solutions in which the order numbers are not directly linked to the order of emission of messages or, for example, are allocated in descending order as a function of the emission of messages.

Furthermore, as already mentioned, and as described hereinafter, the proposed solution permits reception of messages in an order different from the order of emission, such that the order number allocated to each message is not linked to the order of reception of the messages.

As described hereinafter in the case of several conceivable exemplary embodiments, the order number n identifying the message M uniquely makes it possible, by reading in a table $S_R$ indicating the previous reception status and stored in memory means 4, to verify that the message M has not been previously received, in order to detect any replay of the message by an attacker.

In the case in which the message has not been previously received (and therefore the hypothesis of replay is rejected), microprocessor 2 can transmit it to a display device 10 so as to display the message M to a user. Naturally, processing other than display of message M could be envisioned; for example, when the message content constitutes data for use by the craft in which the receiver is installed (such as an aircraft), the processing may consist in using the received data.

There now will be described three examples of a method according to the teachings of the invention for receiving a message, implemented by microprocessor 2 according to instructions stored in memory in the form of a computer program within read-only memory 8.

Figure 3:
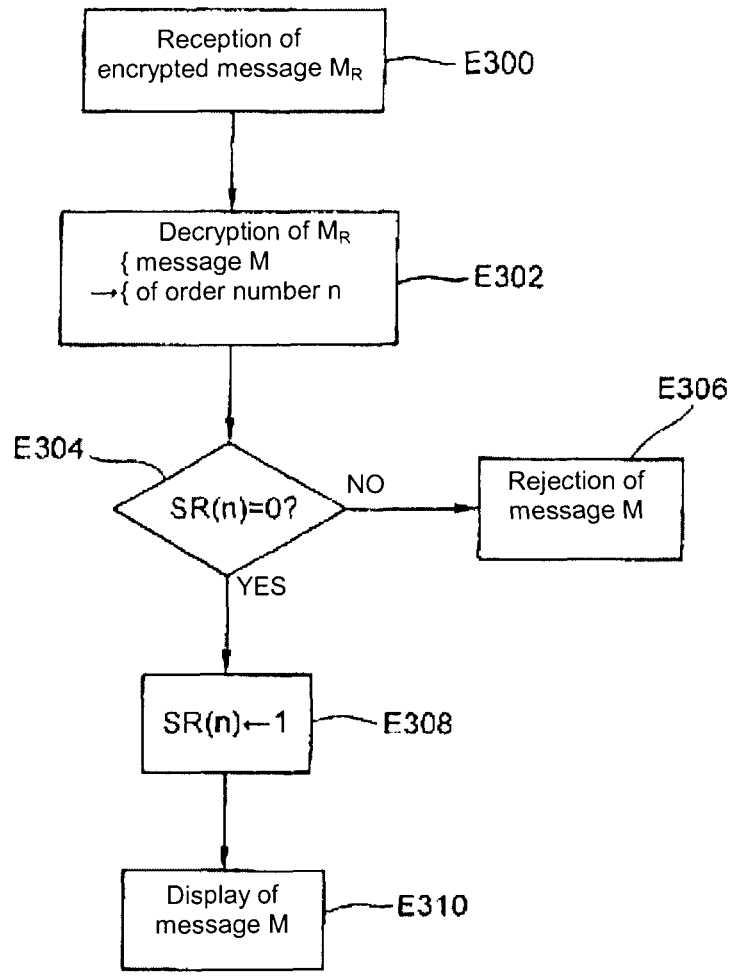
FIG. 3 represents the steps of a method for receiving a message according to the teachings of the invention.

FIG. 3 represents a first example of a method for receiving a message.

This method begins with reception of an encrypted message $M_R$ in the course of a step E300, according to conditions already described.

Receiving device 1 (and in particular microprocessor 2) then decrypts the received message $M_R$ in the course of a step E302, so as to obtain the decrypted message M and the order number n allocated thereto upon emission.

Microprocessor 2 then reads, in a table $S_R$ stored in memory means 4, the previous reception status $S_R(n)$ associated with the order number n.

In the example described here, it is provided that the table $S_R$ is a table of N bits, wherein each bit stores in memory the previous reception of a message having the order number corresponding to the bit in question in the table.

In this table $S_R$, the previous reception of a message of order number i is indicated by the value 1 at position i of the table $S_R$ (or in other words $S_R(i)=1$); if bit $S_R(i)$ has a value of 0, it therefore signifies that no message having the order number i has been received at the moment in question.

Figure 4:
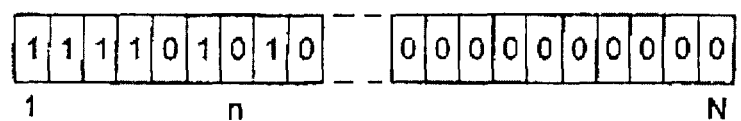
FIG. 4 represents a set of reception statuses used by the method of FIG. 3.

FIG. 4 schematically represents such a table $S_R$ at an operating moment at which only messages having the following order numbers have been received: 1, 2, 3, 4, n−1, n+1 (in FIG. 4, n=7).

In this example, at the operating moment represented in FIG. 4, the message having an order number n has not been received, since the corresponding bit of the table $S_R$ is at zero.

In this way it is possible to verify in step E304 if the read value $S_R(n)$ is indeed zero, or in other words if the reception of the message in the course of step E300 is indeed the first reception of this message.

In the negative (or in other words if $S_R(n)=1$), a message with an identical order number has been received previously, thus implying that the message received in step E300 actually originates from replay of a preceding message and that in this case it must be suspected that an attack is in progress. Accordingly, in this case the message M is rejected in the course of a step E306. Of course, other measures may be taken in this case, such as transmission to display means 10 of a warning message informing the user that a replay attempt has been detected.

On the other hand, if it is verified during step E304 that the message M has not been received earlier (or in other words in the hypothesis that $S_R(n)=0$), the hypothesis of replay is discarded.

Thereupon, during a step E308, the position n of the table $S_R$ is set to 1, in order to indicate for the ensuing messages that the message having an order number n has been received.

It is then possible to proceed to normal processing of the message M, for example to display of the message M, by transmitting it to display device 10 in the course of a step E310.

Figure 5:
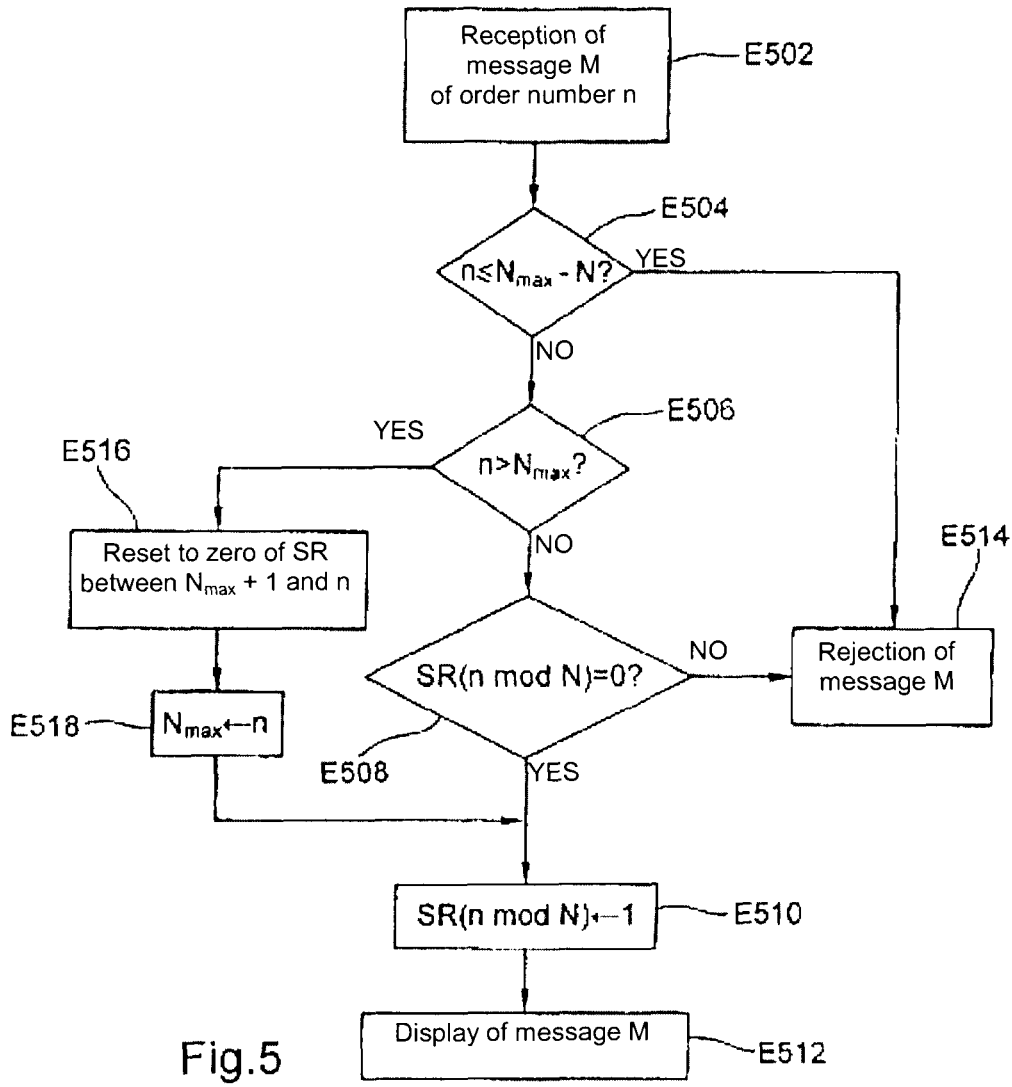
FIG. 5 represents the steps of a method for receiving a message according to a second embodiment of the invention.

FIG. 5 represents a second example of a method for receiving a message according to the teachings of the invention.

Figure 6:
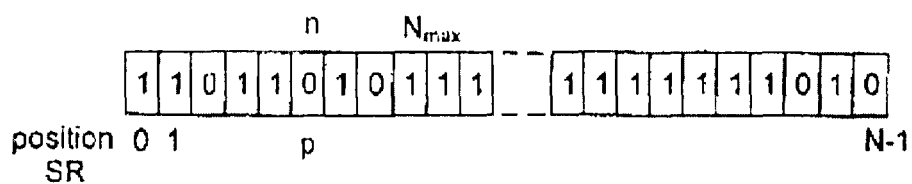
FIG. 6 represents a set of reception statuses used by the method of FIG. 5.

In the present exemplary embodiment, as represented in FIG. 6, a table $S_R$ having a length of N bits, managed in circular manner as described hereinafter, is used to store in memory the order numbers for which a message has been received previously.

The position of a particular bit in the table $S_R$ will be denoted by p, and so $S_R(p)$ is the value of the bit at the position p, where p varies between 0 and N−1.

Also stored in memory means 4 is the value $N_{max}$, which represents the largest order number contained in the table $S_R$ at a given moment. As an example, this value $N_{max}$ is initialized at N−1, such that the table $S_R$ represents, after initialization, the previous reception status of messages having an order number between 0 and N−1. On this occasion, all bits of the table $S_R$ are set to zero.

The method for receiving a message starts with reception, in the course of a step E502, of a message M with which there is associated an order number n, for example by means of decryption of an encrypted message representative of the message M and the order number n, as explained in connection with steps E300 and E302 of FIG. 3 described hereinabove.

During a step E504, the order number n is then compared with the lower value of the order numbers contained in the table $S_R$ (in this case the smallest order number being $N_{max}$−N+1), to verify if the reception status associated with the order number n is still represented in the table $S_R$.

In practice, it is verified if $n \leq N_{max}$−N and, if this is the case, since the received order number is no longer contained in the table $S_R$, it cannot be verified whether or not the received message M constitutes replay of a preceding message, and in the example described here, message M is rejected during a step E514.

If, on the other hand, the received number n is larger than the smallest number represented by the list $S_R$ at the moment in question (or in other words if $n > N_{max}$−N), step E506, now described, is undertaken.

During the course of this step E506, it is then determined if the received order number is larger (strictly) than the largest order number $N_{max}$ contained in the list.

In the affirmative (or in other words if $n > N_{max}$), the circular list formed by the table $S_R$ must be adapted in such a way that it can represent the reception status of messages having an order number that attains the value of the received order number n.

To accomplish this, the positions of the table $S_R$ associated with order numbers between $N_{max}$+1 and n are first reset to zero in a step E516.

In practice, this means here that the bits $S_R(p)$ for which the position p corresponds to values of order numbers between $N_{max}$+1 and n are reset to zero; two cases are possible:
- if $N_{max}$ mod $n < n$ mod N, the values $S_R(p)$ for p ranging from $N_{max}$+1 mod N to n mod N are reset to zero,
- if n mod $N < N_{max}$ mod N, the values $S_R(p)$ for p ranging from $N_{max}$ mod N to N−1 and for p ranging from zero to n mod N are reset to zero.

It is considered here that the difference between the received order number n and the largest order number $N_{max}$ considered in the list $S_R$ is smaller (strictly) than N, which is the case if practice when N is taken as sufficiently large in the system in question.

Furthermore, according to a conceivable embodiment (not described in FIG. 5), it is possible to reject the messages for which the order number would be too different from $N_{max}$, for example different by more than N/2. It may be effectively considered that such an order number might originate from an error or from an attack; in fact, a received order number n larger than the preceding value $N_{max}$ by more than N would cause the entire table to be erased during step E516, thus making reception of subsequent messages having an order number close to $N_{max}$ impossible.

Once the reception statuses associated with numbers between $N_{max}$+1 and n have been reset to zero, the value n of the received order number is overwritten in the register $N_{max}$ as a new maximum order number contained in the table $S_R$.

Circular management of the table $S_R$ is then continued in this way.

By the fact that, in the alternative described here, it was determined in step E506 that the received order number n was strictly larger than the maximum order number $N_{max}$ contained in the table $S_R$, it is known by construction that the situation is one in which the message N having this order number n has not been received previously and that the hypothesis of a replay can therefore be discarded.

This is why step E518 is followed in the example described here by a step E510 described hereinafter, without proceeding to the test of step E508.

If, on the contrary, it is determined during step E506 that the received order number n is not strictly larger than the maximum order number $N_{max}$ contained in the table $S_R$, thus implying that a previous reception status SR(p) is associated with the received order number n in the table SR, it is possible to read this status $S_R(p)$ in memory 4 and to verify whether or not this status indicates that the message having the order number n has already been received.

In the example described here, because of the circular management of the list, the position p in the table $S_R$ associated with the order number n is the remainder of the order number n modulo N, or in other words p=n mod N. Thus, if it is determined in the course of a step E508 that $S_R(n \bmod N) = 1$ (the value 1 indicating that the message having the associated order number was previously received, as in the first embodiment), it is considered that the received message originates from replay of a preceding message by an attacker, and accordingly rejection of the message M is undertaken in step E514.

On the other hand, if it is determined in step E508 that the value of the previous reception status associated with the received order number n is zero (or in other words $S_R(n \bmod N) = 0$), it is considered that the message M is being received for the first time and therefore does not originate from replay of a preceding message by an attacker.

The previously read bit $S_R(n \bmod N)$ can then be set to 1 in step E510, to indicate during reception of future messages that the message having the order number n has already been received.

Once the hypothesis of replay has been discarded by the verification of step E508 (or ruled out by step E506 as already explained), the message M can then be transmitted to display device 10 for display during a step E512.

Figure 7:
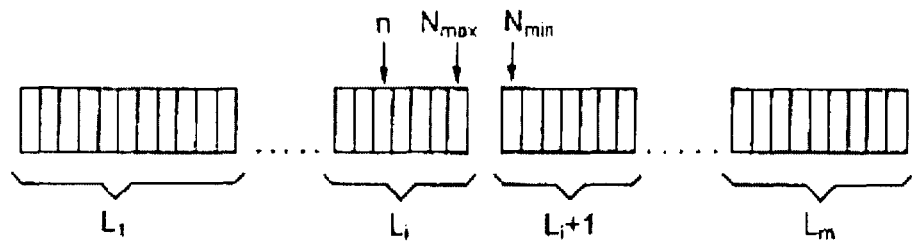
FIG. 7 represents a set of reception statuses used by the method of FIG. 8.

FIG. 7 represents a table of previous reception statuses used in a third embodiment of the invention.

In this embodiment, the table $S_R$ is divided into a plurality of sub-lists $L_1, L_2, \ldots L_m$, each sub-list $L_i$ being formed from a number $B_i$ of bits. The total length B of the table $S_R$ in bits is therefore $B = B_1 + B_2 + \ldots + B_m$.

In this embodiment there are also stored in memory the smallest order number $N_{min}$ and the largest order number $N_{max}$ represented in the table $S_R$. Consequently, $N_{max} = N_{min} + B - 1$.

At each moment, the table $S_R$ composed of sub-lists $L_1, \ldots L_m$ therefore indicates the previous reception status for the messages having an order number n between $N_{min}$ and $N_{max}$.

If the list $L_k$ that at each moment represents the order number $N_{min}$ is designated by k:
the order number n will be associated with the position p of the list $L_i$ such that $$n = p + \sum_{j=k}^{i-1} B_j + N_{min} \text{ when } n - N_{min} < B_k + \ldots + B_m;$$

the order number n will be associated with the position p of the list $L_i$ such that $$n = p + \sum_{j=k}^{i-1} B_j + \sum_{j=k}^{m} B_j + N_{min} \text{ when } n - N_{min} \geq B_k + \ldots + B_m.$$

Figure 8:
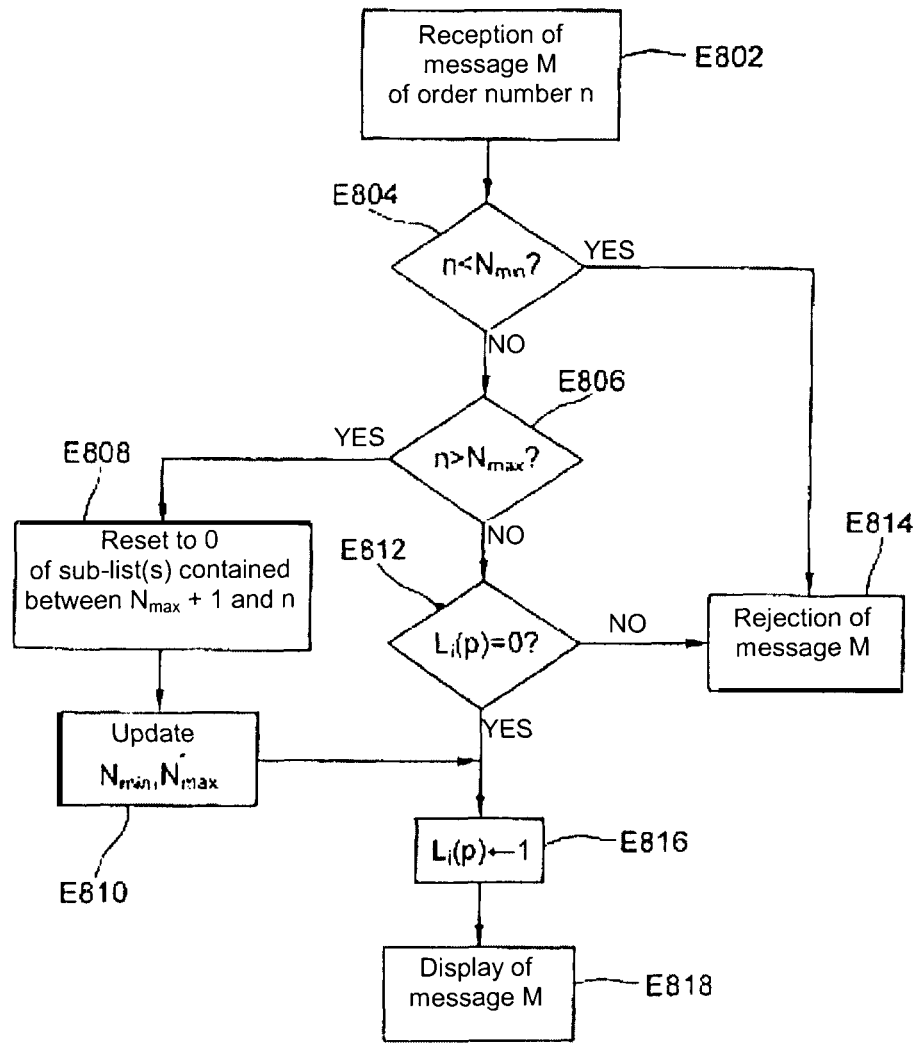
FIG. 8 represents the steps of a method for receiving a message according to a third embodiment of the invention.

FIG. 8 represents the steps of a method for receiving a message according to this third embodiment.

During a step E802 there is received a message M with which there is associated an order number n, as described for the foregoing embodiments.

In the course of a step E804 it is tested whether the received order number n is strictly smaller than the smallest order number $N_{min}$ contained in the table $S_R$, and in the affirmative, the message M is rejected in the course of a step E814, since it is impossible in this case to verify that the message M was not the object of a replay by an attacker.

In the negative, the received order number n is compared with the largest order number $N_{max}$ processed by the table $S_R$ in its current state.

If the received order number n is strictly larger than $N_{max}$, the table $S_R$ must be adapted such that it can take into account the reception of the message M of order number n.

To achieve this, the sub-list (or sub-lists) relating to the previous reception statuses of messages whose order number is between $N_{max}+1$ and n is reset to zero during a step E808.

In practice, this means that, using k as in the foregoing to designate the sub-list $L_k$ containing the order number $N_{min}$ at the moment of reception of the message M in step E802, the sub-lists defined as follows are reset to zero:
reset to zero of sub-lists from the sub-list $L_k$ to the sub-list $L_{k+q}$, such that:

$$\sum_{j=k}^{k+q-1} B_j < n - N_{max} \leq \sum_{j=k}^{k+q} B_j \text{ if } n \leq N_{max} + \sum_{j=k}^{m} B_j$$

(no looping of the circular list);
reset to zero from the sub-list $L_k$ to the sub-list $L_m$ and from the sub-list $L_1$ to the sub-list $L_i$, such that:

$$\sum_{j=k}^{m} B_j + \sum_{j=1}^{i-1} B_j < n - N_{max} \leq \sum_{j=k}^{m} B_j + \sum_{j=1}^{i} B_j \text{ if } n > N_{max} + \sum_{j=k}^{m} B_j$$

(looping of the circular list).

Once the sub-list or the sub-lists has or have been reset to zero, the values $N_{min}$ and $N_{max}$ are correspondingly updated by adding to each of these values the number of bits contained in the set of sub-lists reset to zero in the course of a step E810.

Once the table $S_R$ has been adapted to management of the received order number n as just described with reference to steps E808 and E810, it is indicated that the message having the order number n has been received by setting the bit associated with the number n to 1 in the course of a step E816, described hereinafter.

When the test of step E806 indicates that the received order number n is smaller than or equal to $N_{max}$ (and by reason of the test of step E804), it can be considered that the order number n was processed by the table $S_R$ in its current state.

The position p and the sub-list $L_i$ associated with the received order number n are then determined, in this case according to the correspondence rule described hereinabove.

It is then verified in the course of a step E812 that the bit associated with the order number n indicates that the message has not been received previously (meaning that $L_i(p)=0$), in which case it is possible to proceed to normal processing of the message in step E816, as indicated hereinafter.

If, on the contrary, it is determined in step E812 that the message has already been received (meaning that the associated reception status indicates previous reception of the message by the fact that $L_i(p)=1$), it is considered that the received message has originated from a replay of a preceding message by an attacker, and so the message M is subsequently rejected in step E814.

Step E816 described in the foregoing consists in setting the status (in this case the bit) $L_i(p)$ associated with the order number n to 1, so as to indicate for future messages that the message having this order number has been received.

Step E816 is followed by the usual processing of the message M, such as display thereof by means of display device 10 in the course of a step E818.

The embodiments just described are merely possible exemplary embodiments of the invention, which is not limited thereto.

The invention claimed is:

1. A reception device comprising:
a receiver that receives a message having an order number;
a memory that stores an order number threshold and a plurality of reception statuses each indicating previous reception or no previous reception of a corresponding message;
a processor configured to modify a status associated with the order number upon reception of the message having the order number by the receiving section, the status being one of the plurality of statuses;
the processor further configured to reset a subset of the plurality of reception statuses to each indicate no previous reception when the order number of the message is greater than the order number threshold; and
the processor further configured to process the message based on the status associated with the order number.

2. The reception device according to claim 1, wherein the plurality of reception statuses are stored in the memory in a form of a table of bits.

3. The reception device according to claim 2, wherein the status associated with the order number is represented at a table position corresponding to the order number.

4. The reception device according to claim 2, wherein the table includes a plurality of sub-lists.

5. The reception device according to claim 2, wherein the table contains a finite set of order numbers, and the processor is further configured to initialize part of the plurality of reception statuses when the order number is not included in the finite set of order numbers.

6. The reception device according to claim 4, wherein a sum of a quantity of all the bits in the plurality of sub-lists is equal to a quantity of the plurality of reception statuses each associated with a different order number.

7. The reception device according to claim 1, wherein the processor further comprises a decryption section that obtains the message and the order number from an encrypted message.

8. The reception device according to claim 1, wherein the processor is further configured to reject the message when the associated status indicates previous reception.

9. The reception device according to claim 1, further comprising a display that displays the message when the associated status indicates no previous reception.

10. The reception device according to claim 1, wherein the subset of the plurality of reception statuses includes two or more of the reception statuses, and the processor is further configured to determine the subset of the plurality of reception statuses based on the order number threshold and the order number of the message.

11. An aircraft, comprising:
a reception device including
a receiver that receives a message having an order number,
a memory that stores an order number threshold and a plurality of reception statuses each indicating previous reception or no previous reception of a corresponding message,
a processor that modifies a status associated with the order number upon reception of the message having the order number by the receiving section, the status being one of the plurality of statuses,
the processor further resets a subset of the plurality of reception statuses to each indicate no previous reception when the order number of the message is greater than the order number threshold, and
the processor is configured to process the message based on the status associated with the order number.

12. The aircraft according to claim 11, wherein:
the memory stores the plurality of reception statuses in a form of a table of bits having a plurality of sub-lists; and
a sum of a quantity of all the bits in the plurality of sub-lists is equal to a quantity of the plurality of reception statuses each associated with a different order number.

13. The aircraft according to claim 11, wherein the subset of the plurality of reception statuses includes two or more of the reception statuses, and the processor is further configured to determine the subset of the plurality of reception statuses based on the order number threshold and the order number of the message.

14. A communication method comprising:
receiving a message having an order number;
storing, in a memory, an order number threshold and a plurality of reception statuses each indicating previous reception or no previous reception of a corresponding message;
modifying a status in the plurality of statuses that is associated with the order number when the status indicates no previous reception;
resetting a subset of the plurality of reception statuses to each indicate no previous reception when the order number of the message is greater than the order number threshold; and
rejecting the message when the status indicates previous reception.

15. The method according to claim 14, wherein the plurality of reception statuses are stored in the memory within a table of bits.

16. The method according to claim 15, wherein the status associated with the order number is represented at a table position corresponding to the order number.

17. The method according to claim 15, wherein the table includes a plurality of sub-lists.

18. The method according to claim 17, wherein a sum of a quantity of all the bits in the plurality of sub-lists is equal to a quantity of the plurality of reception statuses each associated with a different order number.

19. The method according to claim 15, wherein the table contains a finite set of order numbers, and the method further comprises initializing at least one reception status in the plurality of reception statuses when the order number is not included in the finite set of order numbers.

20. The method according to claim 14, further comprising decrypting the message and the order number from an encrypted message.

21. The method according to claim 14, further comprising displaying the message when the status indicates no previous reception.

22. The method according to claim 14, further comprising:
determining the subset of the plurality of reception statuses to include two or more of the reception statuses based on the order number threshold and the order number of the message.

23. A method of communicating between an aircraft and a ground station, the method comprising:
receiving a message at the aircraft or the ground station having an order number;
storing, in a memory, an order number threshold and a plurality of reception statuses each indicating previous reception or no previous reception of a corresponding message;
modifying a status in the plurality of statuses that is associated with the order number when the status indicates no previous reception;
resetting a subset of the plurality of reception statuses to each indicate no previous reception when the order number of the message is greater than the order number threshold; and
rejecting the message when the status indicates previous reception.

24. The method according to claim 23, further comprising:
storing the plurality of reception statuses in the memory in a form of a table of bits having a plurality of sub-lists, wherein a sum of a quantity of all the bits in the plurality of sub-lists is equal to a quantity of the plurality of reception statuses each associated with a different order number.

25. The method according to claim 23, further comprising:
determining the subset of the plurality of reception statuses to include two or more of the reception statuses based on the order number threshold and the order number of the message.

26. A reception device comprising:
a receiver that receives a message having an order number;
a memory that stores an order number threshold and a plurality of reception statuses each indicating previous reception or no previous reception of a corresponding message;
means for modifying a status associated with the order number upon reception of the message having the order number by the receiving section, the status being one of the plurality of statuses;
means for resetting a subset of the plurality of reception statuses to each indicate no previous reception when the order number of the message is greater than the order number threshold; and
a processor configured to process the message based on the status associated with the order number.

27. The reception device according to claim 26, wherein:
the memory stores the plurality of reception statuses in a form of a table of bits having a plurality of sub-lists; and
a sum of a quantity of all the bits in the plurality of sub-lists is equal to a quantity of the plurality of reception statuses each associated with a different order number.

28. The reception device according to claim 26, wherein the subset of the plurality of reception statuses includes two or more of the reception statuses, and further comprising means for determining the subset of the plurality of reception statuses based on the order number threshold and the order number of the message.

* * * * *